No. 678,704. Patented July 16, 1901.
F. M. WEIR.
NON-RESEALABLE BOTTLE.
(Application filed Mar. 23, 1901.)

(No Model.)

WITNESSES:

INVENTOR
Frank M. Weir
BY
ATTORNEYS

UNITED STATES PATENT OFFICE.

FRANK MEKEMSON WEIR, OF MONMOUTH, ILLINOIS, ASSIGNOR OF ONE-HALF TO ERIC G. BOWMAN, OF SAME PLACE.

NON-RESEALABLE BOTTLE.

SPECIFICATION forming part of Letters Patent No. 678,704, dated July 16, 1901.

Application filed March 23, 1901. Serial No. 52,546. (No model.)

*To all whom it may concern:*

Be it known that I, FRANK MEKEMSON WEIR, a citizen of the United States, and a resident of Monmouth, in the county of Warren and State of Illinois, have invented a new and Improved Non-Resealable Bottle, of which the following is a full, clear, and exact description.

This invention relates to improvements in bottles, jugs, or jars; and one object is to provide a bottle, jug, or jar with a simple means for sealing it after the original filling and in which the opening will destroy the identity of the vessel as an original package, thus not only protecting the rights of the dealer, but insuring a purchaser that the sealed vessel contains the article originally placed therein; and a further object is to so construct the mouth or neck of the vessel that an ordinary round cork cannot be placed therein.

I will describe a non-resealable bottle embodying my invention and then point out the novel features in the appended claims.

Reference is to be had to the accompanying drawings, forming a part of this specification, in which similar characters of reference indicate corresponding parts in all the figures.

Figure 1:
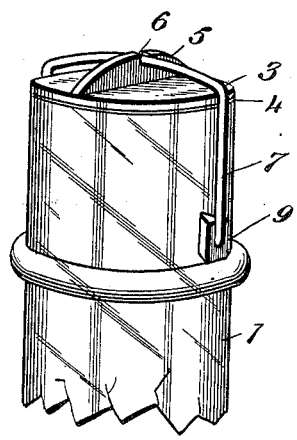
Figure 2:
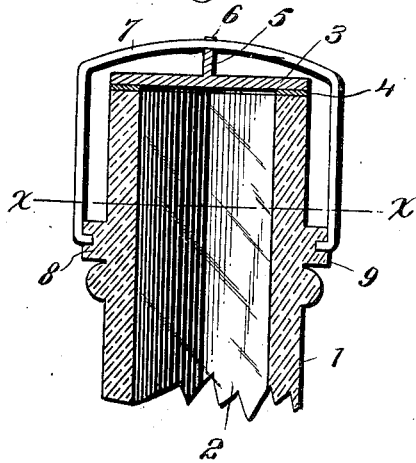
Figure 3:
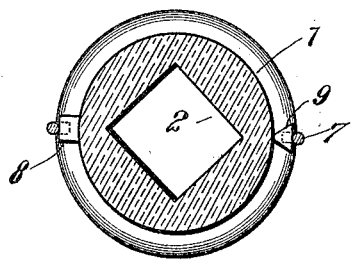

Figure 1 is a perspective view of the neck portion of a bottle, showing a sealing device embodying my invention as applied thereon. Fig. 2 is a vertical section of the same, and Fig. 3 is a section on the line $x\ x$ of Fig. 2.

Referring to the drawings, 1 designates the neck portion of a bottle or vessel, which may be made of any desired shape exteriorly; but the interior or mouth of the neck is made angular in cross-section. I have here shown it as rectangular, as indicated at 2. By this construction it will be impossible to insert an ordinary round cork and seal the bottle. A sealing-cover 3, of glass, metal, or other suitable material, is provided, and arranged between this cover 3 and the end of the neck is a packing-ring 4. Extended across the top of the cover is a rib 5, which is curved from its center downward toward the ends, and at the center the rib is provided with a rectangular notch 6, designed to receive a bail 7, consisting of resilient metal. The ends of this bail are engaged so as to swing in lugs 8 and 9 on opposite sides of the neck. One of the lugs, here shown as the lug 9, is made very thin at its connecting-point with the bottle-neck, so that the said lug may be readily broken off by a slight tap when it is desired to unseal the bottle.

In operation, after placing the liquid or other material in the bottle, the cover 3 is to be placed in position and then the bail moved over the rib 5 until it springs into the notch 6. As this notch is rectangular or has straight opposite side walls, the bail cannot be removed therefrom without breaking the lug 9. When it is desired to unseal the bottle, the lug 9 is to be broken off, as before stated. Then the bail and cover may be readily removed.

Having thus described my invention, I claim as new and desire to secure by Letters Patent—

1. A bottle, lugs extended outward from opposite sides of the neck of the bottle, one of said lugs being made thin at the portion connecting with the neck of the bottle, a cover, a rib on the top of said cover provided with a notch, and a bail having swinging engagement with said lugs and adapted to engage in said notch, substantially as specified.

2. In a bottle, lugs formed on the neck of the bottle at opposite sides thereof, one of said lugs being adapted to be broken from the neck, a cover, a rib extended across the top of said cover and curved from its central portion downward to its ends, the said rib being provided with a rectangular notch at the center, and a resilient-metal bail having swinging connection with the lugs and adapted to engage in said notch, substantially as specified.

In testimony whereof I have signed my name to this specification in the presence of two subscribing witnesses.

FRANK MEKEMSON WEIR.

Witnesses:
ORVILLE J. BOWMAN,
MABEL M. BOWMAN.